United States Patent
Ness et al.

(10) Patent No.: US 12,378,117 B2
(45) Date of Patent: Aug. 5, 2025

(54) DISPERSION AND COATING COMPOSITION CONTAINING LITHIUM METAL PHOSPHATE

(71) Applicant: Evonik Operations GmbH, Essen (DE)

(72) Inventors: Daniel Ness, Hanau (DE); Ryo Takata, Hanau (DE); Daniel Esken, Erlensee (DE); Katharina Dauth, Offenbach (DE)

(73) Assignee: Evonik Operations GmbH, Essen (DE)

( * ) Notice: Subject to any disclaimer, the term of this patent is extended or adjusted under 35 U.S.C. 154(b) by 653 days.

(21) Appl. No.: 17/693,763

(22) Filed: Mar. 14, 2022

(65) Prior Publication Data

US 2022/0289572 A1    Sep. 15, 2022

(30) Foreign Application Priority Data

Mar. 15, 2021  (EP) .................................... 21162508

(51) Int. Cl.
| | |
|---|---|
| *C01B 25/45* | (2006.01) |
| *H01M 4/13* | (2010.01) |
| *H01M 4/139* | (2010.01) |
| *H01M 4/66* | (2006.01) |
| *H01M 10/052* | (2010.01) |
| *H01M 10/0562* | (2010.01) |
| *H01M 50/449* | (2021.01) |
| *H01M 10/0525* | (2010.01) |

(52) U.S. Cl.
CPC ............. *C01B 25/45* (2013.01); *H01M 4/13* (2013.01); *H01M 4/139* (2013.01); *H01M 4/667* (2013.01); *H01M 10/052* (2013.01); *H01M 10/0562* (2013.01); *H01M 50/449* (2021.01); *C01P 2004/64* (2013.01); *C01P 2006/10* (2013.01); *C01P 2006/12* (2013.01); *H01M 10/0525* (2013.01)

(58) Field of Classification Search
CPC ...... C01B 25/30; C01B 25/45; C01P 2002/72; C01P 2004/45; C01P 2004/62; C01P 2004/64; C01P 2006/10; C01P 2006/12; C07F 9/11; C09D 1/00; C09D 7/20; C09D 7/61; H01M 4/0404; H01M 4/13; H01M 4/139; H01M 4/1397; H01M 4/5825; H01M 4/60; H01M 4/623; H01M 4/667; H01M 10/052; H01M 10/0525; H01M 10/0562; H01M 10/4235; H01M 12/06; H01M 50/403; H01M 50/431; H01M 50/449; H01M 50/461; H01M 2300/0068; Y02E 60/10
See application file for complete search history.

(56) References Cited

U.S. PATENT DOCUMENTS

| | | | |
|---|---|---|---|
| 2014/0120402 A1 | 5/2014 | Yu et al. | |
| 2014/0363738 A1 * | 12/2014 | Blanc ................ | H01M 50/457 521/88 |
| 2017/0373284 A1 | 12/2017 | Durstock et al. | |
| 2018/0076453 A1 | 3/2018 | Durstock et al. | |
| 2018/0090782 A1 * | 3/2018 | Choi ....................... | H01M 4/62 |
| 2019/0334168 A1 | 10/2019 | Durstock et al. | |
| 2020/0313182 A1 | 10/2020 | Durstock et al. | |
| 2020/0313184 A1 | 10/2020 | Durstock et al. | |

FOREIGN PATENT DOCUMENTS

| | | | | |
|---|---|---|---|---|
| CN | 105655563 A | 6/2016 | | |
| WO | WO-2017125264 A1 * | 7/2017 | ............... | C09D 5/00 |
| WO | WO 2020/172330 A1 | 8/2020 | | |

OTHER PUBLICATIONS

"Yang, Synthesis and Characterizations of Lithium Aluminum Titanium Phosphate (Li1+xAlxTi2-x(PO4)3) Solid Electrolytes for All-Solid-State Li-ion Batteries, 2017, CORE Scholar" (Year: 2017).*
European Extended Search Report issued Sep. 9, 2021 in European Application 21162508.2 filed on Mar. 15, 2021, 5 pages.
Wang et al., "Lithium Ion Conducting Poly(ethylene oxide)-Based Solid Electrolytes Containing Active or Passive Ceramic Nanoparticles", The Journal of Physical Chemistry C, vol. 121, No. 5, 2017, 11 pages.

* cited by examiner

*Primary Examiner* — Milton I Cano
*Assistant Examiner* — Jesse J Efymow
(74) *Attorney, Agent, or Firm* — Oblon, McClelland, Maier & Neustadt, L.L.P.

(57) ABSTRACT

A dispersion may include 1 to 50% by weight of lithium metal phosphate of a general formula $$Li_{1+a}M_{2-b}N_c(PO_4)_{3+d},$$

wherein M is Ti, Zr or Hf; N is a metal other than Li and M; $0 \le a \le 0.6$, $0 \le b \le 0.6$, $0 \le c \le 0.6$, $0 \le d \le 0.8$; and 50 to 99% by weight of trialkyl phosphate. A coating composition may include such a dispersion and such dispersions can be used in lithium ion batteries.

20 Claims, No Drawings

DISPERSION AND COATING COMPOSITION CONTAINING LITHIUM METAL PHOSPHATE

CROSS-REFERENCE TO RELATED APPLICATIONS

The present application claims the benefit of the filing date of European Appl. No. 2 116 2508.2, filed on Mar. 15, 2021, the content of which is incorporated by reference herein.

FIELD OF THE INVENTION

The invention relates to a dispersion and a coating composition comprising lithium metal phosphate, a method for producing such a dispersion and the use thereof in lithium ion batteries.

PRIOR ART

Secondary lithium ion batteries are one of the most important battery types currently used. The secondary lithium ion batteries are usually composed of an anode made of a carbon material or a lithium-metal alloy, a cathode made of a lithium-metal oxide, an electrolyte in which a lithium salt is dissolved in an organic solvent and a separator providing the passage of lithium ions between the positive and the negative electrode during the charging and the discharging processes.

The typical constituents of such a liquid lithium ion battery, such as the cathode, the anode and the separator can be coated with a layer made of a metal oxide or a compound providing lithium ion conductivity. This leads to the formation of a defined solid electrolyte interface (SEI), which conducts Li-ions and is resistant to possible electrolyte decomposition products.

In endeavour to develop secondary batteries with improved intrinsic safety and energy density, the use of solid instead of liquid electrolytes has considerably progressed in the recent time. Among such systems, secondary lithium batteries with electrodes made of lithium metal or lithium metal alloys are believed to provide high energy density and be particularly suitable. Such all-solid-state secondary lithium ion batteries should have good ion conductivity at an interface between an electrode active material and an electrolyte in order to have the required load characteristics.

H. Xiea, et al., describe in Journal of Power Sources 2011, vol. 196, pp. 7760-7762, preparation of $Li_{1.2}Zr_{1.9}Ca_{0.1}(PO_4)_3$ by a solid-state reaction of $ZrO_2$ with $Li_2CO_3$, $NH_4H_2PO_4$, and $CaCO_3$. Li-ion conductivity of this lithium zirconium phosphate was found to be comparable with that of $Li_{1.3}Ti_{1.7}Al_{0.3}(PO_4)_3$ used as a solid Li-ion separator in test cells of Li-ion batteries.

I. Hanghofer, et al., describe in Dalton Trans., 2019, vol. 48, pp. 9376-9387, preparation of a rhombohedral Ca-stabilized $Li_{1.4}Ca_{0.2}Zr_{1.8}(PO_4)_3$ by a solid-state reaction of $Li_2CO_3$, $(NH_4)_2HPO_4$ and $CaCO_3$ with either $ZrO_2$ or zirconium acetate suitable as a solid electrolyte for use in all-solid-state lithium ion batteries.

Y. Li, et al., describe in PNAS, 2016, vol. 113 (47), pp. 13313-13317, preparation of a rhombohedral $LiZr_2(PO_4)_3$ by solid-state reaction of $(NH_4)_2HPO_4$ with $Li_2CO_3$ and zirconium acetate and its use as a solid electrolyte of an all-solid state lithium ion battery. The cell comprising $LiZr_2(PO_4)_3$ was prepared by putting lithium foil on both sides of the $LiZr_2(PO_4)_3$ pellet.

Apart from using as solid electrolytes or solid Li-ion separators in lithium ion batteries, lithium metal phosphates can also be applied as thin coating layers for modifying the active electrodes or separators of the batteries.

Thus, a high ion conductivity can be achieved by coating the surface of an active electrode material with some lithium-comprising compounds, such as $LiTi_2(PO_4)_3$, as described in US2009081554A1. In US2009081554A1, the coating layer of lithium titanium phosphate is prepared directly on the surface of the electrode using coating of the electrode with an ethanolic solution of precursors lithium ethylate, diphosphorus pentaoxide and titanium tetraisopropoxide.

Problem and Solution

Preparation of a coating layer made of lithium metal phosphate on the surface of an electrode from the solutions of the corresponding precursors is not so convenient, as it requires very careful selection of the reaction conditions, which should be compatible with both the used precursors and the substrate to be coated.

It is therefore desirable to find a method for direct applying of prepared beforehand lithium metal phosphate.

One possibility of doing so would be using a dispersion comprising fine particles of lithium metal phosphates.

It turned out, however, that preparation of such ready-to-use dispersions is quite problematic. Using common solvents, such as alcohols or dimethoxyethane (DME) lead to unstable dispersions, tending to formation of large agglomerates of lithium metal phosphate and highly viscous pastes instead of desired fine particulate dispersions.

Such dispersions are not suitable for obtaining high quality homogeneous coating layers of lithium metal phosphates required for lithium ion batteries.

The problem addressed by the present invention is that of providing a dispersion of lithium metal phosphate substantially free of large agglomerates. Such a dispersion should preferably possess relatively low viscosity and be stable for at least several days, preferably several weeks, i.e. not lead to a substantial viscosity increase and precipitation or agglomerate formation during this time.

Such dispersions should be well suitable for preparing coating compositions for coating the constituents of lithium ion batteries, particularly anodes, cathodes, separators.

A further problem addressed by the invention is that of providing a method for producing such dispersions.

The invention provides dispersion comprising 1% to 50% by weight of lithium metal phosphate of a general formula $Li_{1+a}M_{2-b}N_c(PO_4)_{3+d}$, wherein M=Ti, Zr or Hf;
N=metal other than Li and M;
$0 \le a \le 0.6$, $0 \le a \le 0.6$, $0 \le c \le 0.6$, $0 \le d \le 0.8$,
and 50% to 99% by weight of trialkyl phosphate.

Such dispersions surprisingly turned out to be low viscous and stable over a prolonged period, even if very small lithium metal phosphate particles are present. It was further found that coating compositions comprising such dispersions are well suitable for coating the constituents of a lithium ion battery.

Lithium Metal Phosphate

Lithium metal phosphate employed in the inventive dispersion has a general formula $Li_{1+a}M_{2-b}N_c(PO_4)_{3+d}$, wherein M=Ti, Zr or Hf, preferably M=Zr;
N=metal other than Li and M;

0≤a≤0.6, 0≤a≤0.6, 0≤c≤0.6, 0≤d≤0.8, preferably 0≤a≤0.3, 0≤b≤0.3, 0≤s c≤0.3, 0≤d≤0.4

The other than Li and M metal N can preferably be chosen from Na, K; Be, Mg, Ca, Sr, Ba, Zn, Co, Ni, Cu, Mn, B, Al, Ga, In, Fe, Sc, Y, La, Ce, Si, Ge, Sn, Pb, V, Nb, Ta, Mo, W, and a combination thereof. In the context of the present invention, silica and boron are to be regarded as metals, and their compounds are referred to as "metal precursors".

Preferably, the lithium metal phosphate of the invention contains calcium (Ca), aluminium (Al), iron (Fe) and/or yttrium (Y).

The lithium metal phosphate employed in an inventive dispersion may have a BET surface area of 5 $m^2/g$-100 $m^2/g$, preferably of 7 $m^2/g$-80 $m^2/g$, more preferably of 15 $m^2/g$-60 $m^2/g$.

The BET surface area can be determined according to DIN 9277:2014 by nitrogen adsorption according to Brunauer-Emmett-Teller procedure.

The lithium metal phosphate employed in an inventive dispersion is preferably in the form of aggregated primary particles, those primary particles preferably having a numerical mean diameter of primary particles of typically 1-100 nm, preferably 3-70 nm, more preferably 5-50 nm, as determined by transition electron microscopy (TEM). This numerical mean diameter can be determined by calculating the average size of at least 500 particles analysed by TEM.

Dynamic light scattering (DLS) is a technique in physics that can be used to determine the size distribution profile of small particles in suspension. This technique can be used to measure the particle size of dispersed material in the range from 3 nm to 6 µm. The measurement is based on the Brownian motion of the particles within the medium and the scattering of incident laser light because of a difference in refraction index of liquid and solid material.

The resulting value is the hydrodynamic diameter of the particle's corresponding sphere. The values $d_{50}$, $d_{90}$ and $d_{99}$ are common standards for discussion, as these describe the hydrodynamic diameter of the particle below which 50%, 90% or 99% of the particles are within the particle size distribution. The lower these values, the better the particle dispersion. Monitoring these values can give a clue about the particle dispersion stability. If the values increase tremendously, the particles are not stabilized enough and may tend to agglomerate and sediment over time resulting in a lack of stability. Depending on the viscosity of the medium, it can be stated, that a $d_{99}$ value of <1000 nm (1 µm) is an indication for a stable dispersion as the particles are held in abeyance over time.

The numerical mean particle diameter $d_{50}$ of the lithium metal phosphate in the inventive dispersion is preferably about 0.03 µm-2 µm, more preferably 0.04 µm-1 µm, even more preferably 0.05 µm-0.5 µm, as determined by dynamic light scattering (DLS) at a temperature of 25° C. in the with trialkyl phosphate diluted dispersion containing about 1% by weight of the lithium metal phosphate.

The numerical mean particle diameter $d_{99}$ of the lithium metal phosphate in the inventive dispersion is preferably less than 1 µm, more preferably about 0.05 µm-1 µm, more preferably 0.1 µm-0.8 µm, even more preferably 0.15 µm-0.5 µm, as determined by dynamic light scattering (DLS) at a temperature of 25° C. in the with trialkyl phosphate diluted dispersion containing about 1% by weight of the lithium metal phosphate.

Thus, compared to similar dispersions, but e.g. using another than trialkyl phosphate dispersant, the inventive dispersion is substantially free from large particles, i.e. those with a particle size of more than 1 µm. This makes the inventive dispersion particularly useful for producing coating compositions with small, finely distributed lithium phosphate particles, particularly suitable for coating the elements of a lithium ion battery.

The agglomerates and partly the aggregates of lithium metal phosphates can be further destroyed e.g. by grinding or ultrasonic treatment of the particles to result in particles with a smaller particle size and a narrower particle size distribution.

The lithium metal phosphate employed in the dispersion according to the invention preferably has a tamped density of 20 g/L-200 g/L, more preferably 25 g/L-150 g/L, even more preferably 30 g/L-100 g/L, still more preferably 40 g/L-80 g/L.

Tamped density of a pulverulent or coarse-grain granular material can be determined according to DIN ISO 787-11: 1995 "General methods of test for pigments and extenders—Part 11: Determination of tamped volume and apparent density after tamping". This involves measuring the apparent density of a bed after agitation and tamping.

The lithium metal phosphate employed in the inventive dispersion is preferably obtained by a pyrogenic process, also referred to as "fumed" process. The terms "pyrogenically produced", "pyrogenic" and "fumed" are used as equivalents in the context of the present invention. Such "pyrogenic" or "fumed" processes involve the reaction of the corresponding metal precursors in a flame hydrolysis or a flame oxidation in an oxyhydrogen flame to form pyrogenically produced compounds. This reaction initially forms highly disperse approximately spherical primary particles, which in the further course of the reaction coalesce to form aggregates. The aggregates can then accumulate into agglomerates. In contrast to the agglomerates, which as a rule can be separated into the aggregates relatively easily by introduction of energy, the aggregates are broken down further, if at all, only by intensive introduction of energy. Said particles may be partially destructed and converted into the nanometre (nm) range particles by suitable grinding. However, such grinding is not required, since the "as-prepared" fumed particles have sufficiently small particle sizes.

Lithium metal phosphate is preferably produced by means of flame spray pyrolysis preferably using solutions of metal carboxylates and organic phosphates as precursors.

During such flame spray pyrolysis process, a solution of metal compounds (metal precursors) and a phosphorous source in the form of fine droplets is typically introduced into a flame, which is formed by ignition of a fuel gas and an oxygen-containing gas, where the used metal precursors together with the phosphorous source are oxidized and/or hydrolysed to give the corresponding lithium metal phosphate.

The flame spray pyrolysis process preferably comprises the following steps:
a) the solution of metal precursors is atomized to afford an aerosol by means of an atomizer gas,
b) the aerosol is brought to reaction in the reaction space of the reactor with a flame obtained by ignition of a mixture of fuel gas and an oxygen-containing gas to obtain a reaction stream,
c) the reaction stream is cooled and
d) the solid lithium metal phosphate is subsequently removed from the reaction stream.

Examples of fuel gases are hydrogen, methane, ethane, natural gas and/or carbon monoxide. It is particularly preferable to employ hydrogen. A fuel gas is employed in particular for embodiments where a high crystallinity of the lithium metal phosphate to be produced is desired.

The oxygen-containing gas is generally air or oxygen-enriched air. An oxygen-containing gas is employed in particular for embodiments where for example a high BET surface area of the lithium metal phosphate to be produced is desired. The total amount of oxygen is generally chosen such that, it is sufficient at least for complete conversion of the fuel gas and the metal precursors.

For obtaining the aerosol, the vaporized solution containing metal precursors can be mixed with an atomizer gas, such as nitrogen, air, and/or other gases. The resulting fine droplets of the aerosol preferably have an average droplet size of 1-120 μm, particularly preferably of 30-100 μm. The droplets are typically produced using single- or multi-material nozzles. To increase the solubility of the metal precursors and to attain a suitable viscosity for atomization of the solution, the solution may be heated.

The metal carboxylates used as precursors in the flame spray pyrolysis process may independently of each other be a linear, branched or cyclic pentanoate (C5), hexanoate (C6), heptanoate (C7), octanoate (C8), nonanoate (C9), decanoate (D10), undecanoate (C11), dodecanoate (C12), tridecanoate (C13), tetradecanoate (C14), pentadecanoate (C15), hexadecanoate (C16), heptadecanoate (C17), octadecanoate (C18), nonadecanoate (C19), icosanoate (C20) of the employed metals, and the mixtures thereof.

Metal precursors may also be inorganic metal compounds, such as nitrates, carbonates, chlorides, bromides, or other organic metal compounds, such as alkoxides, e.g. ethoxides, n-propoxides, isopropoxides, n-butoxides and/or tert-butoxides.

The organic phosphate used in the flame spray pyrolysis process is preferably selected from esters of phosphonic acid ($H_3PO_3$), orthophosphoric acid ($H_3PO_4$), methaphosphoric acid ($HPO_3$), pyrophosphoric acid ($H_4P_2O_7$), polyphosphoric acids, and mixtures thereof.

The organic phosphate can be selected from alkyl esters, such as methyl, ethyl, propyl, butyl, hexyl, aryl esters, such as phenyl, mixed alkyl/aryl esters, and mixture thereof.

The use of organic phosphates as phosphorous source in the flame spray pyrolysis process is preferable if small particles of lithium metal phosphate with a high BET surface area and low tamped density are required.

The solvent used for the employed metal precursors can be selected from the group consisting of linear or cyclic, saturated or unsaturated, aliphatic or aromatic hydrocarbons, esters of carboxylic acids, ethers, alcohols, carboxylic acids, and the mixtures thereof.

Lithium metal phosphates known from the prior art, which are usually prepared by solid state syntheses, have relatively high material densities and low BET surface areas, which is suitable for using such materials e.g. as a core material of a solid-state electrolyte of a lithium ion battery. However, if such compounds are supposed to be used as additives, which can be well distributed in the core material or on its surface, smaller particle size, lower material density and higher BET surface area thereof are of crucial importance.

Therefore, lithium metal phosphates prepared by pyrogenic methods, e.g. as described above, are particularly suitable for providing the inventive dispersions and the use thereof in lithium ion batteries.

The lithium metal phosphates obtained by a pyrogenic process can further be thermally treated. This further thermal treatment is preferably carried out at a temperature of 600° C.-1300° C., more preferably at 650° C.-1250° C., even more preferably at 700° C.-1200° C., still more preferably at 750° C.-1150° C. The thermal treatment allows obtaining lithium metal phosphate with optimized properties, especially the desired crystalline structure.

The lithium metal phosphates obtained by a pyrogenic process can further be milled, preferably using a ball mill. The ball milling is preferably carried out by $ZrO_2$ balls, e.g. with a diameter of about 0.5 mm in an appropriate solvent, such as ethanol or isopropanol.

Dispersion Comprising Lithium Metal Phosphate

The inventive dispersion comprises 1% to 50% by weight, preferably 5% to 45%, more preferably 10% to 40%, more preferably 15% to 35%, of the lithium metal phosphate, and 50% to 99% by weight, preferably 55% to 95% by weight, more preferably 60% to 90% by weight, more preferably 65% to 85% by weight, of trialkyl phosphate.

The trialkyl phosphate is preferably chosen from the group consisting of trimethyl phosphate, triethyl phosphate, tri-n-propyl phosphate, tri-isopropyl phosphate, methyl diethyl phosphate, and mixtures thereof.

The selected trialkyl phosphates have the advantage that they are water-soluble and thus cleaning steps are simplified.

The inventive dispersion can contain other than the lithium metal phosphate and the trialkyl phosphate components, such as solvents, dispersants or other additives.

Thus, solvents selected from the group consisting of water, dimethyl sulfoxide, tetramethylurea, dimethylformamide, dimethylacetamide, N-methyl-2-pyrrolidone and acetone, can be present in the inventive dispersion as such other components.

Suitable dispersants can be polymers having acid functional groups and/or amine functional groups or the salts of such functional groups, such as alkylammonium salts or alkanolammonium salts. Acid groups can be phosphoric acid groups or sulfonic acid groups. The number average molecular weight of such dispersants is preferably at least 500 g/mol, particularly preferably 500 g/mol to 1000 g/mol. The dispersants may be both polymers and copolymers, e.g. block copolymers or copolymers with statistical structures. Suitable dispersants are available from Byk Chemie under the trade name Disperbyk®. For the preparation of suitable dispersants, reference is also made to WO2010/025889 and EP-A-893155.

Total amount of such other components in the inventive dispersion can be up to 20% by weight, more preferably up to 10% by weight, more preferably up to 5% by weight.

However, preferably, such other components are substantially absent in the inventive dispersion, i.e. their amount is less than 0.5% by weight.

All components of the inventive dispersion sum up to 100% by weight based on the total weight of the dispersion.

The dynamic viscosity of the inventive dispersion determined at a shear rate of 10 $s^{-1}$ and 22° C. is preferably less than 60 mPas, more preferably less than 50 mPas, more preferably in the range from 1 mPas to 50 mPas, more preferably from 2 mPas to 40 mPas, more preferably from 3 mPas to 30 mPas.

The dynamic viscosity of the inventive dispersion can be measured at a shear rate of 10 $s^{-1}$ and 22° C. using any suitable device for determining the dynamic viscosity.

Process for Producing the Dispersion Comprising Lithium Metal Phosphate

The invention further comprises a process for manufacturing the dispersion according to the invention, comprising mixing the lithium metal phosphate and the trialkyl phosphate and optional grounding or milling the resulting dispersion. The particle size of the agglomerates can be significantly reduced using these milling technologies.

Preparation of the inventive dispersion is preferably carried out at 10° C.-50° C., more preferably 15° C.-40° C.

To avoid the unwanted warming up of the dispersion during the grounding or milling thereof, the dispersion can be cooled by means of a heat exchanger.

If a dispersion with particularly small particle size is to be produced, it can be ground or milled, e.g. by means of a high-energy mill, such as wet-jet mill.

For this purpose, a pre-dispersion containing lithium metal phosphate particles and trialkyl phosphate, for example the dispersion obtained by means of a rotor/stator system or a dissolver equipment, is divided into at least two sub-streams, and these sub-streams are relieved in a high-energy mill under a pressure of at least 500 bar through a nozzle, allowing the partial flows to meet in a gas or liquid-filled reaction chamber. Such high-energy grinding can be repeated several times. A suitable high-energy mill is, for example, the Ultimaizer System, model HJP-25050, from Sugino Machine Ltd.

Grounding or milling in the inventive process can also be carried out by a rotor-stator system, homogenization, ultra-sound treatment, or a ball mill.

The ball milling can be carried out using a conventional lab or production scale ball mill with $ZrO_2$ beads having a diameter of about 0.8 mm. Preferably, the ball milling process provides 0.1 to 10 kWh/kg, preferably 0.2 to 5 kWh/kg, more preferably 0.5 to 3 kWh/kg energy to the dispersion.

Wet Coating Composition Comprising the Inventive Dispersion and Dry Coating Composition Obtained Thereof The invention further provides wet coating composition comprising the dispersion according to the invention, an organic binder, and optionally a solvent.

Such a wet coating composition preferably comprises 50%-99% by weight, more preferably 55%-95% by weight, 60%-90% by weight, 65%-85% by weight of the inventive dispersion and 1%-50% by weight, more preferably 5%-45% by weight, more preferably 10%-40% by weight, more preferably 15%-35% by weight, of an organic binder and optionally 1%-50% by weight, more preferably 5%-45% by weight, more preferably 10%-40% by weight, more preferably 15%-35% by weight of a solvent.

All components of the wet composition sum up to 100% by weight based on the total weight of the composition.

The organic binder can be chosen from the group consisting of polyethylene oxide, polyvinylidene fluoride, polyvinylidene chloride, polytetrafluoroethylene, polyacrylonitrile, polyamides, polyimides, polyether ether ketone, polymethyl methacrylate, polytetraethylene glycol diacrylate, polyvinylidene fluoride/hexafluoropropylene copolymer, polyvinylidene fluoride/chlorotrifluoroethylene copolymer, polysulfones, polyether sulfones, and mixtures thereof.

The solvent optionally used in the wet coating composition of the invention can be selected from the group consisting of water, alcohols, aliphatic and aromatic hydrocarbons, ethers, esters, aldehydes, ketones and the mixtures thereof. For example, the solvent used can be water, methanol, ethanol, propanol, butanol, pentane, hexane, benzene, toluene, xylene, diethyl ether, methyl tert-butyl ether, ethyl acetate, acetone, dimethylformamide, dimethoxyethane, trialkyl phosphates. Particularly preferably, the solvent used in the wet coating composition has a boiling point of less than 300° C., particularly preferably less than 200° C. at 1 atm. Such relatively volatile solvents can be easily evaporated or vaporized during the curing of the wet coating composition according to the invention. Most preferably, the wet coating composition of the invention contain trialkyl phosphate chosen from the group consisting of trimethyl phosphate, triethyl phosphate, tri-n-propyl phosphate, tri-isopropyl phosphate, methyl diethyl phosphate, and mixtures thereof as a sole solvent.

The coating composition of the invention can be prepared by mixing the inventive dispersion with at least one organic binder, preferably those described above and optionally with other additives, such as solvents, dispersants, etc. preferably those referred to above.

The invention further provides the use of the wet coating composition according to the invention for coating the constituents of a lithium ion battery such as positive and negative electrodes or separators of a lithium ion battery.

The method of coating using the inventive wet coating composition can comprise the following steps:
a) applying the inventive coating composition on the surface of a constituent of a lithium ion battery, such as its electrode or membrane,
b) curing of the organic binder and/or removing of the solvent.

In step a) of the coating method, the inventive wet coating composition preferably forms a layer with a thickness of less than 100 μm on the coated substrate, more preferably of 10 μm-100 μm, particularly preferably from 20 μm to 80 μm.

The curing of the composition in step b) can be achieved by at least partial polymerization and/or removal of the solvent. Depending on the system used, this step can preferably take place at a temperature of from 0 to 500° C., particularly preferably from 5 to 400° C., very particularly preferably from 10 to 300° C. The curing can take place in the presence of air or with exclusion of oxygen, for example under a protective-gas atmosphere of nitrogen or carbon dioxide. Said step can take place under standard pressure or under a reduced pressure, for example under vacuum.

The invention further provides dry coating composition obtained by evaporation of trialkyl phosphate and optionally solvents from the wet composition according to the invention. The organic binder present in the wet coating composition of the invention can be cured before, during or after the evaporation of the trialkyl phosphate and optionally the solvent from the wet coating composition.

The inventive dry coating composition preferably forms a layer with a thickness of less than 30 μm on the coated substrate, more preferably less than 20 μm, particularly preferably from 1 μm to 10 μm.

The invention further provides the use of the inventive wet coating composition or the dry coating composition according to the invention for coating electrodes or separators of a lithium ion battery.

Lithium Ion Battery Comprising the Inventive Dispersion

The invention further provides lithium ion battery comprising the dry coating composition according to the invention.

The lithium ion battery of the invention can contain a positive electrode (cathode), a negative electrode (anode), a separator and an electrolyte containing a compound comprising lithium.

The positive electrode (cathode) of the lithium ion battery usually includes a current collector and an active cathode material layer formed on the current collector.

The current collector may be an aluminium foil, copper foil, a nickel foil, a stainless-steel foil, a titanium foil, a polymer substrate coated with a conductive metal, or a combination thereof.

The active positive electrode materials may include materials capable of reversible intercalating/deintercalating lithium ions and are well known in the art. Such active positive electrode materials may include transition metal oxides, such as mixed oxides comprising Ni, Co, Mn, V or other transition metals and optionally lithium. The mixed lithium transition metal oxides used with preference as active positive electrode materials are selected from the group consisting of lithium-cobalt oxide, lithium-manganese oxide, lithium-nickel-cobalt oxides, lithium-nickel-manganese-cobalt oxides, lithium-nickel-cobalt-aluminium oxides, lithium-nickel-manganese oxides, or a mixtures thereof.

The anode of the lithium ion battery may comprise any suitable material, commonly used in the secondary lithium ion batteries, capable of reversible intercalating/deintercalating lithium ions. Typical examples thereof are carbonaceous materials including crystalline carbon such as natural or artificial graphite in the form of plate-like, flake, spherical or fibrous type graphite; amorphous carbon, such as soft carbon, hard carbon, mesophase pitch carbide, fired coke and the like, or mixtures thereof. In addition, lithium metal or conversion materials (e.g. Si or Sn) can be used as anode active materials.

The electrolyte of the lithium ion battery can be in the liquid, gel or solid form.

The liquid electrolyte of the lithium ion battery may comprise any suitable organic solvent commonly used in the lithium ion batteries, such as anhydrous ethylene carbonate (EC), dimethyl carbonate (DMC), propylene carbonate, methylethyl carbonate, diethyl carbonate, gamma butyrolactone, dimethoxyethane, fluoroethylene carbonate, vinylethylene carbonate, or a mixture thereof.

The gel electrolytes include gelled polymers.

The solid electrolyte of the lithium ion battery may comprise oxides, e.g. lithium metal oxides, sulfides, phosphates, or solid polymers.

The liquid or polymer gel electrolyte of the lithium ion battery usually contains a lithium salt. Examples of such lithium salts include lithium hexafluorophosphate ($LiPF_6$), lithium bis 2-(trifluoromethylsulfonyl)imide (LiTFSI), lithium bis (fluorosulfonyl) imide (LiFSI), lithium perchlorate ($LiClO_4$), lithium tetrafluoroborate ($LiBF_4$), $Li_2SiF_6$, lithium triflate, $LiN(SO_2CF_2CF_3)_2$, lithium nitrate, lithium bis(oxalate)borate, lithium-cyclo-difluoromethane-1,1-bis (sulfonyl)imide, lithium-cyclo-hexafluoropropane-1,1-bis (sulfonyl)imide and mixtures thereof.

The lithium ion battery, especially the one with liquid or gel electrolyte can also comprise a separator, which prevents the direct contact between the two electrodes, which would lead to the internal short circuit.

The material of the separator may comprise a polyolefin resin, a fluorinated polyolefin resin, a polyester resin, a polyacrylonitrile resin, a cellulose resin, a non-woven fabric or a mixture thereof. Preferably, this material comprises a polyolefin resin such as a polyethylene or polypropylene based polymer, a fluorinated resin such as polyvinylidene fluoride polymer or polytetrafluoroethylene, a polyester resin such as polyethylene terephthalate and polybutylene terephthalate, a polyacrylonitrile resin, a cellulose resin, a non-woven fabric or a mixture thereof.

The lithium ion battery according to the invention may comprise a liquid electrolyte, a gel electrolyte or a solid electrolyte. The liquid mixture of the lithium salt and the organic solvent, which is not cured, polymerized or cross-linked, is referred to as "liquid electrolyte" in the context of the present invention. The gel or solid mixture comprising a cured, polymerized or cross-linked compound or their mixtures, optionally a solvent, and the lithium salt is referred to as a "gel electrolyte". Such gel electrolytes can be prepared by polymerization or cross-linking of a mixture, containing at least one reactive, i.e. polymerizable or cross-linkable, compound and a lithium salt.

A special type of lithium-ion battery is a lithium-polymer battery, wherein a polymer electrolyte is used instead of a liquid electrolyte. The electrolyte of a similar solid-state battery can also comprise other types of solid electrolytes, such as sulfidic, oxidic solid electrolytes, or mixtures thereof.

The battery of the invention can be a lithium metal battery, such as Li-air, lithium sulphur (Li—S), and other types of lithium metal batteries.

A Li-air battery typically contains a porous carbon cathode and an organic, glass-ceramic or polymer-ceramic type electrolyte.

A Li-sulfur (Li—S) battery usually contains an iron disulfide ($FeS_2$), an iron sulfide (FeS), a copper sulfide (CuS), a lead sulfide and a copper sulfide (PbS+CuS) cathode.

There are also many other known types of lithium metal batteries such as e.g. lithium-selenium (Li—Se), lithium-manganese dioxide (Li—$MnO_2$ or Li/Al—$MnO_2$), lithium-monofluoride (Li—$(CF)_x$), lithium-thionyl chloride (Li—$SOCl_2$), lithium-sulfuryl chloride (Li—$SO_2Cl_2$), lithium-sulfur dioxide (Li—$SO_2$), lithium-iodine (Li—$I_2$), lithium-silver chromate (Li—$Ag_2CrO_4$), lithium-vanadium pentoxide (Li—$V_2O_5$ or Li/Al—$V_2O_5$), lithium-copper chloride (Li—$CuCl_2$), lithium copper (II) oxide (Li—CuO), lithium-copper oxyphosphate (Li—$Cu_4O(PO_4)_2$) and other types.

EXAMPLES

Example 1: Preparation of Lithium Zirconium Phosphate 23.75 Kilogram of a solution containing 3370 g of a commercial solution (Borchers® Deca Lithium 2), containing 2 wt % lithium in the form of lithium neodecanoate dissolved in naphtha, 15 kg of a commercial solution (Octa Solingen® Zirconium 12), containing 11.86 wt % Zr in the form of zirconium ethyl hexanoate dissolved in white spirit and 5384 g of a commercial solution (Alfa Aesar), containing 16.83 wt % phosphorous in the form of triethyl phosphate were mixed, resulting in a clear solution. This solution corresponding to a composition of $LiZr_2(PO_4)_3$.

An aerosol of 1.5 kg/h of this dispersion and 15 $Nm^3/h$ of air was formed via a two-component nozzle and sprayed into a tubular reaction with a burning flame. The burning gases of the flame consisted of 8.5 $Nm^3/h$ of hydrogen and 30 $Nm^3/h$ of air. Additionally, 25 $Nm^3/h$ of secondary air was used. After the reactor the reaction gases were cooled down and filtered.

The obtained lithium zirconium phosphate powder had a BET surface area of 44 $m^2/g$, tamped density of 52 g/L and a $d_{50}$ value of 76 nm, as determined by static light scattering method. XRD analysis showed, that the major phase of the product was the rhombohedral lithium zirconium phosphate.

Measuring of Dynamic Viscosity

The dynamic viscosity of the dispersions was measured with the Physica MCR 301 from Anton Paar using the rotational viscosity method and a measuring plate PP25 with the distance set to 0.5 mm.

The motor of the viscometer drives a bob inside a fixed cup. The rotational speed of the bob is preset and produces a certain motor torque that is needed to rotate the measuring bob. This torque must overcome the viscous forces of the tested substance and is therefore a measure for its viscosity. Data are measured at a shear rate of 10 s$^{-1}$ and 22° C.

Example 2: Preparation of an LZP Dispersion

Lithium zirconium phosphate (LZP, 6 g) prepared in example 1 was added to triethyl phosphate (TEP, 14 g) while treating the mixture with ultrasound generated by ultrasound processor UP400S, 400 Watt, 24 kHz equipped with a Ti-sonotrode for 30 minutes. Particle size distribution was measured after dilution with TEP to obtain about 1 wt % LZP concentration using dynamic light scattering (DLS) method by means of LB-500 device (Horiba Ltd., Japan).

$D_{50}$, $d_{90}$ and $d_{99}$ values obtained by DLS method directly after preparation of the dispersion as well as $d_{99}$ values after 1 week and 4 weeks of storage of the dispersion at room temperature and the dynamic viscosity of the dispersion measured at 10 s$^{-1}$ and 22° C. after production are shown in Table 1.

Example 3: Preparation of an LZP Dispersion

The ball mill equipment (Netzsch Laboratory Mill Micro Series) was pre-loaded with triethylphosphate (TEP, 315 g), the peristaltic pump was set to a rotation speed of 90 rpm and the ball mill to 1000 rpm. Lithium zirconium phosphate (LZP, 135 g) was added to TEP. The peristaltic pump was then adjusted to rotation speed of 120 rpm and the ball mill was set to a rotation speed of 2500 rpm. The dispersion was treated for 120 minutes (0.4 kWh energy was introduced). The particle size distribution was measured as in example 2. $D_{50}$, $d_{90}$ and $d_{99}$ values obtained by DLS method directly after preparation of the dispersion as well as $d_{99}$ values after 1 week and 4 weeks of storage of the dispersion at room temperature and the dynamic viscosity of the dispersion measured at 10 s$^{-1}$ and 22° C. after production are shown in Table 1.

Comparative Example 1

A 30 wt % dispersion of LZP in ethanol (EtOH) was prepared identically to example 2 with the only difference that EtOH was used instead of TEP.

$D_{50}$, $d_{90}$ and $d_{99}$ values obtained by DLS method directly after preparation of the dispersion as well as $d_{99}$ values after 1 week and 4 weeks of storage of the dispersion at room temperature and the dynamic viscosity of the dispersion measured at 10 s$^{-1}$ and 22° C. after production are shown in Table 1.

Comparative Example 2

A 30 wt % dispersion of LZP in iso-propanol (iPrOH) was intended to be prepared identically to example 2 with the only difference that iPrOH was used instead of TEP.

However, the dispersion became very viscous during the preparation, no particle size distribution or viscosity measurement was possible.

Comparative Example 3

A 30 wt % dispersion of LZP in dimethoxyethane (DME) was intended to be prepared identically to example 2 with the only difference that DME was used instead of TEP.

However, the dispersion became very viscous during the preparation, no particle size distribution or viscosity measurement was possible.

Comparison of examples 2-3 with comparative examples 1-3 shows that with TEP as a solvent, LZP dispersions with a considerably lower $d_{99}$ particle sizes (Table 1), i.e. those substantially free of large particles >1 μm, can be obtained. Importantly, such dispersions with TEP solvent possess low viscosities and remain stable without any agglomeration of the particles after 1 and 4 weeks of storage at room temperature, conversely to the dispersion from comparative example 1 with EtOH as a solvent (Table 1).

Example 4: Preparation of a Coating Composition

Slurry A: The 30 wt % dispersion of LZP in TEP prepared in example 3 was diluted with TEP to a solid content of 20 wt. % LZP under stirring.

Slurry B: Poly(vinylidene fluoride-co-hexafluoropropylene, PVDF-HFP) organic binder with a MW of 400.000 g/mol from Sigma Aldrich, Germany was completely solved in TEP under stirring overnight at 35° C. to form a 10 wt. % solution PVDF-HFP in TEP.

Slurries A and B were mixed together to achieve the final LZP-to-binder ratio LZP:PVDF of 6:1 (The resulting coating composition was composed of 75 wt % of the dispersion of example 3, slurry A and 25% of slurry B and contained 15 wt % LZP, 2.5 wt % PVDF-HFP and 82.5 wt % TEP).

Example 5: Coating of a Copper Foil with the Coating Composition of Example 4

5 ml of the coating composition obtained in example 4 was placed into the doctor blade device (Doctor blade: Quadruple Film Applicator, Model 360 from Erichsen, Germany with a slit of 50 μm). The coating speed was set to 0.4 m/min and the coating of a copper foil with a thickness of 18 μm (Hohsen, Japan) was started. A stable and homogenous wet film with a thickness of approx. 50 μm could be obtained on the surface of the copper foil.

This wet coating was dried at 100° C. for 2 h to obtain an LZP dry coating layer with a thickness of 5 μm. The adhesion of this layer to the copper foil was excellent.

TABLE 1

Dispersions of lithium zirconium phosphate in various solvents

| | zirconium compound | Solvent | $d_{50}$ [nm] | $d_{90}$ [nm] | $d_{99}$ [nm] | $d_{99}$ (1 week) [nm] | $d_{99}$ (4 weeks) [nm] | viscosity (10 s$^{-1}$), mPas |
|---|---|---|---|---|---|---|---|---|
| Comparative Example 1 | LZP | EtOH | 132 | 241 | 1985 | 4918 | 4616 | 65 |
| Comparative Example 2[(1)] | LZP | iPrOH | — | — | — | — | — | — |
| Comparative Example 3[(2)] | LZP | DME | — | — | — | — | — | — |
| Example 1 | LZP | TEP | 150 | 253 | 409 | 391 | 366 | 8 |
| Example 2 | LZP | TEP | 135 | 211 | 290 | 317 | 308 | 10 |

[(1)], [(2)] dispersion became very viscous during preparation, no particle size or viscosity were measured

The invention claimed is:

1. A dispersion, comprising:
50 to 99 wt. % of trialkyl phosphate; and
1 to 50 wt. % of lithium metal phosphate of formula

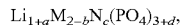

$Li_{1+a}M_{2-b}N_c(PO_4)_{3+d}$, wherein
M is Ti, Zr, or Hf,
N is metal other than Li and M,
$0 \leq a \leq 0.6$,
$0 \leq b \leq 0.6$,
$0 \leq c \leq 0.6$, and
$0 \leq d \leq 0.8$, and
wherein the lithium metal phosphate has a particle size $d_{99}$ of less than 1 µm, as determined by dynamic light scattering (DLS) at a temperature of 25° C. in a diluted form of the dispersion, with trialkyl phosphate, comprising 1 wt. % of the lithium metal phosphate.

2. The dispersion of claim 1, wherein the lithium metal phosphate is in the form of aggregated primary particles.

3. The dispersion of claim 1, wherein the lithium metal phosphate is obtained by a pyrogenic process.

4. The dispersion of claim 1, wherein the lithium metal phosphate has a BET surface area in a range of from 5 to 100 m$^2$/g.

5. The dispersion of claim 1, wherein the particle size $d_{99}$ of the lithium metal phosphate is in a range of from 0.05 to 0.8 µm, as determined by dynamic light scattering (DLS) at a temperature of 25° C. in a diluted form of the dispersion, with trialkyl phosphate, comprising 1 wt. % of the lithium metal phosphate.

6. The dispersion of claim 1, wherein the lithium metal phosphate has a tamped density in a range of from 20 to 200 g/L.

7. The dispersion of claim 1, wherein the trialkyl phosphate comprises trimethyl phosphate, triethyl phosphate, tri-n-propyl phosphate, triisopropyl phosphate, methyl diethyl phosphate, or a mixture thereof.

8. A process for manufacturing the dispersion of claim 1, the process comprising:
mixing the lithium metal phosphate and the trialkyl phosphate, to obtain a resulting dispersion; and
optionally grounding or milling the resulting dispersion.

9. The process of claim 8, wherein grounding or milling is carried out by an ultrasound treatment, or with a wet-jet mill, or a ball mill.

10. A wet coating composition, comprising:
the dispersion of claim 1;
an organic binder; and
optionally, a solvent.

11. The composition of claim 10, comprising:
50 to 99 wt. % of the dispersion;
1 to 50 wt. % of the organic binder; and
optionally, 1 to 50 wt. % of a solvent.

12. The composition of claim 10, wherein the organic binder comprises polyethylene oxide, polyvinylidene fluoride, polyvinylidene chloride, polytetrafluoroethylene, polyacrylonitrile, polyamide, polyimide, polyether ether ketone, polymethyl methacrylate, polytetraethylene glycol diacrylate, polyvinylidene fluoride/hexafluoropropylene copolymer, polyvinylidene fluoride/chlorotrifluoroethylene copolymer, polysulfone, polyether sulfone, or a mixture of two or more of any of these.

13. A dry coating composition, obtained by evaporation of trialkyl phosphate and any solvents present from the wet composition of claim 10.

14. A process for an coating electrode or separator of a lithium ion battery, the process comprising:
contacting the wet coating composition according to claim 10 or a dry coating composition, obtained by evaporation of trialkyl phosphate and any solvents present from the wet composition, with the electrode or separator of the lithium ion battery.

15. A lithium ion battery, comprising:
the dry coating composition of claim 13.

16. The dispersion of claim 1, wherein the trialkyl phosphate comprises trimethyl phosphate.

17. The dispersion of claim 1, wherein the trialkyl phosphate comprises triisopropyl phosphate.

18. The dispersion of claim 1, wherein the trialkyl phosphate comprises methyl diethyl phosphate.

19. The dispersion of claim 1, wherein the lithium metal phosphate comprises a lithium zirconium phosphate.

20. The dispersion of claim 1, wherein the particle size $d_{99}$ of the lithium metal phosphate is in a range of from 0.15 to 0.5 µm, as determined by dynamic light scattering (DLS) at a temperature of 25° C. in a diluted form of the dispersion, with trialkyl phosphate, comprising 1 wt. % of the lithium metal phosphate.

* * * * *